(12) United States Patent
Chevallier et al.

(10) Patent No.: US 8,195,028 B2
(45) Date of Patent: Jun. 5, 2012

(54) METHOD FOR IDENTIFYING A DOCUMENT RECORDED BY A DISPLAY, SELECTION OF KEY IMAGES AND AN ASSOCIATED RECEPTOR

(75) Inventors: Louis Chevallier, La Meziere (FR);
Lionel Oisel, La Nouaye (FR);
Jean-Ronan Vigouroux, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 559 days.

(21) Appl. No.: 12/086,074

(22) PCT Filed: Nov. 29, 2006

(86) PCT No.: PCT/EP2006/069036
§ 371 (c)(1),
(2), (4) Date: Sep. 24, 2009

(87) PCT Pub. No.: WO2007/065818
PCT Pub. Date: Jun. 14, 2007

(65) Prior Publication Data
US 2010/0046909 A1 Feb. 25, 2010

(30) Foreign Application Priority Data
Dec. 8, 2005 (FR) ...................................... 05 53775

(51) Int. Cl.
*H04N 9/80* (2006.01)
(52) U.S. Cl. ...................................................... 386/241
(58) Field of Classification Search ............. 375/200.08; 386/240, 241, 248, 251, 278, 281; 715/202, 715/700, 719; 725/32, 35
See application file for complete search history.

(56) References Cited

U.S. PATENT DOCUMENTS

| 4,602,297 | A | * | 7/1986 | Reese | ........................... 386/251 |
| 6,278,446 | B1 | * | 8/2001 | Liou et al. | ..................... 715/700 |
| 6,321,024 | B1 | | 11/2001 | Fujita et al. | |

(Continued)

FOREIGN PATENT DOCUMENTS

EP 0638861 2/1995
(Continued)

OTHER PUBLICATIONS

Search Report Dated Feb. 2, 2007.

*Primary Examiner* — Thai Tran
*Assistant Examiner* — Stephen Smith
(74) *Attorney, Agent, or Firm* — Robert D. Shedd; Jeffrey M. Navon (57) ABSTRACT

The present invention relates to a method for identifying an audiovisual document. Initially, the user programs the recording in an audiovisual content device with the aim of recording a determined document. Once the recording has been performed, the device detects and displays identifiers associated with shots extracted from the recorded content, each associated shot having at least one determined characteristic. An indication of the probability associated with each shot so that said shot is indeed the shot identifying the start or the end of said document is also displayed. Then, the user introduces a selection command for a displayed identifier, the start or the end of said document being identified by the shot associated with the selected identifier. The invention also relates to a receiver featuring a user interface implementing the method.

14 Claims, 4 Drawing Sheets

U.S. PATENT DOCUMENTS

| | | |
|---|---|---|
| 6,591,058 B1 | 7/2003 | O'Connor et al. |
| 2003/0234805 A1* | 12/2003 | Toyama et al. ............... 345/723 |
| 2004/0170392 A1* | 9/2004 | Lu et al. .......................... 386/96 |
| 2004/0268390 A1* | 12/2004 | Ibrahim Sezan et al. ....... 725/35 |
| 2005/0100308 A1* | 5/2005 | Moteki ............................. 386/4 |
| 2005/0183016 A1* | 8/2005 | Horiuchi et al. .............. 715/719 |
| 2006/0114992 A1* | 6/2006 | Shibata et al. ........... 375/240.08 |
| 2007/0033515 A1* | 2/2007 | Sull et al. ................... 715/500.1 |

FOREIGN PATENT DOCUMENTS

| | | |
|---|---|---|
| EP | 1377047 | 1/2004 |
| EP | 1515552 | 3/2005 |
| EP | 1530216 | 5/2005 |

\* cited by examiner

METHOD FOR IDENTIFYING A DOCUMENT RECORDED BY A DISPLAY, SELECTION OF KEY IMAGES AND AN ASSOCIATED RECEPTOR

This application claims the benefit, under 35 U.S.C. §365 of International Application PCT/EP2006/069036, filed Nov. 29, 2006, which was published in accordance with PCT Article 21(2) on Jun. 14, 2007 in French and which claims the benefit of French patent application No. 05 53775, filed Dec. 8, 2005.

The present invention relates to a method for identifying an audiovisual document recorded by a receiver by displaying and selecting key pictures, and a device suitable to implement the method.

The invention is particularly applicable in systems where an information set such as an audiovisual transmission is made available to a user following a recording. The most well known systems are the Personal Video Recorders (PVR). PVRs are generally equipped with a hard disk enabling recording of at least ten hours of audiovisual content in compressed form. With an 80 Gigabyte disk, approximately 40 hours of audiovisual content can be recorded. Other recording supports can also be considered such as the cassette of a video-recorder, or a magneto-optical disk.

The invention is particularly applicable to systems enabling recorded information, to be successively read, in series.

As a general rule, the audiovisual content of PVRs is downloaded from a unidirectional broadcast network. The displayed menus enable users to be informed of the audiovisual documents that will be available on the network at more or less short notice. The displayed menu comprises at least a document identifier, generally its title, the time slot during which the document will be broadcast by the network, and an identifier of the broadcast channel. If the user foresees being absent during the broadcast of the desired document, he programs his PVR for an automatic recording. For that, the user enters the start and finish time, the channel reference being generally supplied by the broadcast service information. At the specific time, the PVR starts up, locks onto the correct channel then records all the data packets representing in digital form the desired audiovisual document. When the user returns, he can start the replay of recorded content and hence see what has been received in his absence.

To facilitate the task of selecting and commanding the recording, a program guide (EPG) is generally used. EPG is a software that uses the information flows broadcast at the same time as the video stream. These streams are associated with a particular channel (TNT for example) or an entire package. The stream content used by an EPG typically consists in a table of programs forecast for the current week with their titles and the time of the broadcast. Additional information may be broadcast for each document just prior to broadcast. It is meant to transmit a more precise indication of the actual time of the document broadcast (EIT P/F of DVB). To program his recording, the user only has to designate a document in this table, on a suitable UI.

It so happens that, for problems linked to the production and broadcast of documents, said documents are rarely broadcast at the exact time forecast by the EPG. To be sure that the document will be recorded in its entirety, the user is often obliged to add temporal "margins" at the beginning and at the end of his programming, the system can also do this automatically by activating an option. Hence, that which is recorded at the beginning of the disk systematically has content foreign to the document itself, which results in a loss of time for the user and unnecessarily occupies memory space. A first solution involves viewing the entire document then going back and positioning a start marker and an end marker thus delimiting the desired document. But this method is fastidious.

Another method involves automatically detecting specific sequences. For example, the document U.S. Pat. No. 4,977,455 describes a system composed of a personal computer and a video recorder. The PC has a clock and at a time indicated by the broadcaster, sends a signal to record to the VCR. During the recording, the VCR indexes the document and informs the PC. In this way, the PC knows where the document is recorded on the magnetic tape. Then during the reading, the index markers are transmitted to the PC that is thus able to know the position of the read head of the VCR and from this fact where to look for the document (forwards or backwards). The sequences before and after the desired document having a clearly determined characteristic, it is possible to automatically delimit the document and when the user requests it, to reproduce the document from its actual start. But experience has shown that documents (advertising sequences for example) that can be automatically delimited are not numerous. Consequently, when the user wants to record any document, this technique is no longer satisfactory.

The patent application document EP 1 530 216 deposed by TOSHIBA discloses a picture editor. The document is divided into "shots" having particular characteristics. Each shot is identified by a picture that the user can select. The interface menu enables the user to select a picture in order to access the shot.

The U.S. Pat. No. 6,321,024 deposed by FUJITA discloses menus appearing on a screen for video processing. The user quickly scans the document and stops on a picture that he marks. Then the software determines the start and the end of the shot and displays the two pictures. The user can thus see the start and the end of the sequence and confirm it.

Neither of these two documents provides help in the choice offered to the user.

The invention relates to a method for identifying an audiovisual document within a reproduction device, said document being part of a recorded content also containing a part that does not belong with said document, characterized in that it comprises:

a display step (2.4) of identifiers associated with shots having determined characteristics and a display step with an indication of the probability associated with each shot that this shot is indeed the identifier of the start or the end of said document.

an identification step (2.6) of the start or the end of said document by an introduction step (2.5) of a displayed identifier selection command into the reproduction device, the start or the end of said document having been identified by the shot associated with the selected identifier.

In this way, following a recording where the user has programmed margins in order to be sure of recording the desired document, this user can inform his device of the beginning and/or the end of the document by selecting on the screen the sequence that he considers to be really the start and/or end of the document. A probability value associated with each shot is also displayed. In this way, the user is guided in his choice of shots defining the start and/or end of the document.

According to a first improvement, the characteristic of a displayed shot is part of a determined characteristic set, known to the reproduction device.

According to another improvement, after the precise identification of the document by the user, the parts of audiovisual content not part of the document are erased. In this way, memory space in the device can be freed up for other purposes.

According to another improvement, the probability value associated with each shot is displayed. In this way, the user is guided in his choice of shots defining the start and/or end of the document. Hence the device indicates the shots that are probably those that define the start and/or end of the document. According to another improvement, the probability value associated with a shot relates to the number of preceding shot selections having the same determined characteristics as the given shot. In this way, if the user has previously selected shots having a certain characteristic, shots having the same characteristic will be proposed in priority during the next identification steps.

According to another improvement, the probability value of a shot depends upon the detection method by the determined characteristic that enabled its detection and the display of its identifier. In this way, the device highlights for the user those shots having characteristics that render them more probable to be identified as the start and/or end of the document.

According to another improvement, following the identification of the start or end of said document by the introduction of a selection command, the probability value of a given shot is increased if the period between this given shot and the shot selected by the command corresponds to the duration of the document. In this way, the probability of finding the other extremity of the document is increased. According to another improvement, the shot identifiers are displayed according to an order depending on their respective probability values.

According to another improvement, only shots detected during a determined period from the start of the recorded content and/or to the end of the recorded content will be displayed. It is not useful to display the shots situated in the middle of the recorded content because they probably do not correspond to the start or end of the document.

According to another improvement, the user selects a shot immediately before the shot identified as being the start of the document, or the shot immediately after the shot identified as the end of the document. In this way, the identification of the document can be made by the end of the part of recorded content not included in the document actually desired by the user, or by the start of the last part of recorded content not included in the document.

According to another improvement, a temporal indication is displayed, indicating for each displayed shot the moment the shot appears in the recorded content. In this way, the user better situates each shot having at least one determined characteristic, within the recorded content.

The purpose of the present invention is also a display device comprising a means to command the recording of a document and a means to record the audiovisual content including said document and a least a part not belonging to said document, characterized in that it comprises a means to display the identifiers associated with the shots from recorded content and an indication of the probability associated with each shot so that said shot is indeed the shot identifying the start or end of said document, said associated shots having a determined characteristic and, a means of introducing a selection command for one of the displayed identifiers, the start or end of said document being identified by the shot associated with the selected identifier.

Other characteristics and advantages of the invention will emerge with the description of a non-restrictive embodiment of the invention, explained using the figures herein, among which.

To facilitate the description, the invention will be described hereafter in the framework of the display of an audiovisual program. The invention is nevertheless applicable to the acquisition by the user (play, listening, etc.) of any other type of information normally presented in a sequential manner.

According to the present embodiment, the receiver for the implementation of the invention could be an interactive television set, it can also be a receiver designed for the reception of digital video data, or authorizing the connection to a bi-directional communication network, Internet for instance. The displayed elements are for example lists of services broadcasting audiovisual documents.

Figure 1:
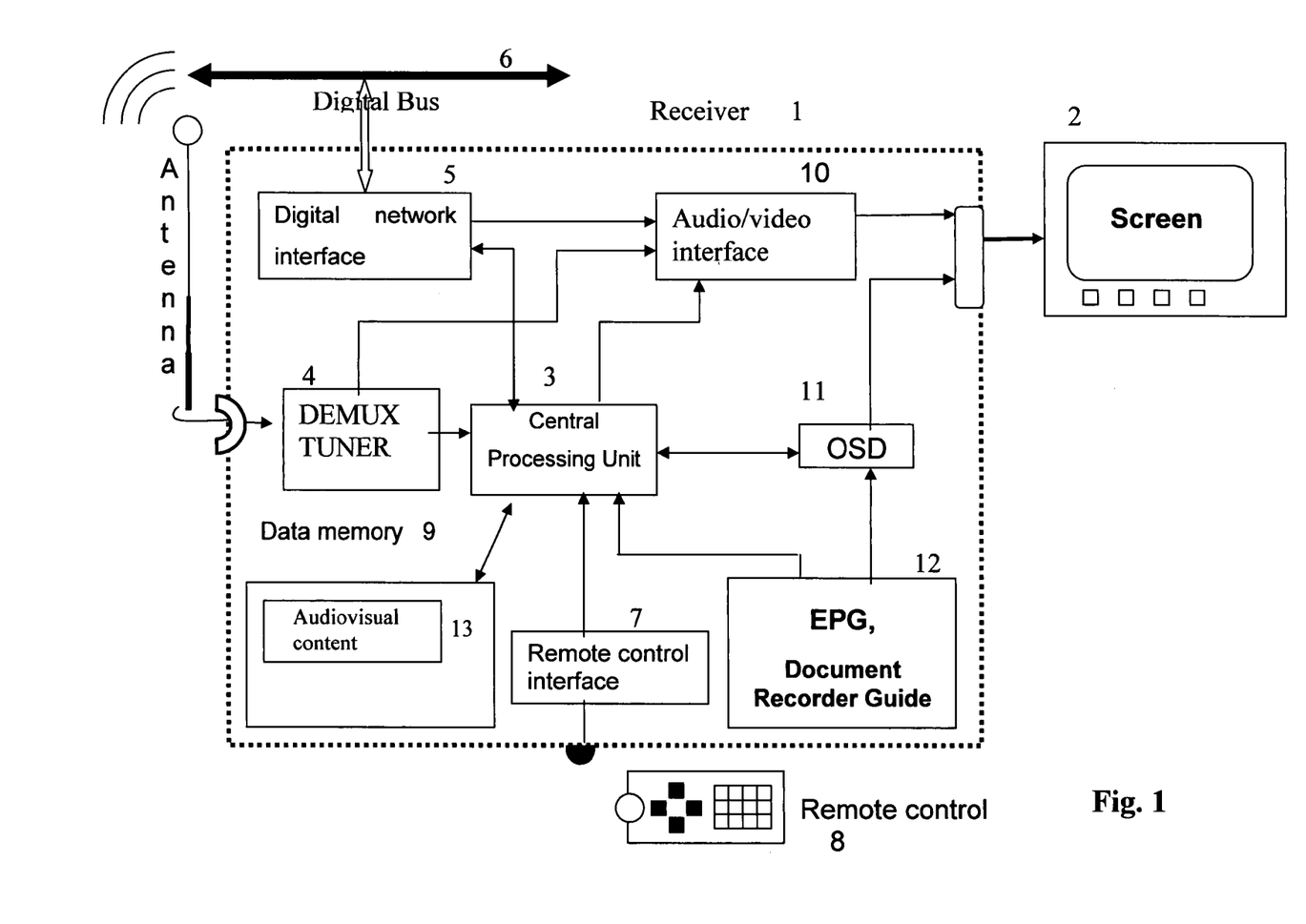
FIG. 1 is a block diagram of a television reception and document recording system according to the present embodiment.

FIG. 1 is a block diagram of an audiovisual receiver recorder, typically a PVR. The receiver 1 is connected to a display screen 2, an antenna, itself connected to a reception means 4 that comprises a tuner that supplies a signal to a demodulator, the data received is corrected by a corrective circuit and sent to a demultiplexer. The demultiplexer comprises a certain number of filters programmed by a central unit 3 according to diverse applications supported by the receiver 1. The filters correspond to an item of identification information present in the header of the packets of the demodulated signal.

The audio and/or video sections or packets filtered by the demultiplexer are stored in predefined zones of a data memory 9. The memory 9 is typically a hard disk with a minimum capacity of 80 gigabytes. If necessary, the information is first deciphered by a deciphering circuit according to the rights of the user, before being stored in the data memory 9. The receiver also comprises an audio/video decoding logic 10 for the generation of audiovisual signals sent to the television screen 2, and possibly an interface 5 for the communication with a local digital bus 6 enabling audio/video data to be received from a bi-directional network with a storage in the memory 9. This network is for example an IEEE 1394 network. A memory 12 contains the operating software of the receiver and the specific applications. According to the present embodiment, the memory 12 contains at least one user interface module called "Document Recorder Guide". For the clarity of the diagram, the memory 12 is shown in the form of a single block, but comprises at the same time the random access memory, the read only memory and the reprogrammable persistent memory (for example of the 'Flash' type).

The receiver 1 also comprises an infrared interface 7 of a remote control 8, said interface also being connected to the microprocessor 3. The remote control features the navigation buttons ↑, ↓, → and ← and "Record" and a validation button "OK" whose respective functions will be seen further on. The use of navigation buttons in no way limits the invention to this type of button, the use of "Up" and "Down" direction buttons or a mouse, or any other pointing means to navigate a displayed list is completely conceivable.

A character generator 11, often known as an OSD circuit, from "On Screen Display" enables the generation of command menus of graphics relating to the parameters of the receiver or to a particular application. The video signal generated by this character generator is multiplexed with one of the video signals coming from reception means 4 or from the interface 5 with the digital network to a first SCART socket connected to the display screen 2.

The embodiment is situated within the framework of a digital television broadcast system, for example of the DVB type (Digital Video Broadcast). The invention is not limited to this framework, and can be used in other environments where ordered lists of elements are presented to a user. The user interface comprises an electronic program guide application. This guide allows the user to access descriptive information relating to the services as well as the present and future documents broadcast by these services. This information is derived from data also broadcast over the network. According to the present embodiment, this data is service data of the DVB, described in detail in the document "EN 300 468 Digital Video Broadcasting; Specification for Service Information (SI) in DVB systems". This document is published by the ETSI ("European Telecommunications Standards Institute"). This data is transported in the multiplexed stream received by the receiver in packets having identifiers marked in a known manner by the demultiplexer of the reception circuit 4 under the control of the microprocessor 3 and recovered by said microprocessor in a part of the data memory 9, for use by the EPG and the Document Recorder Guide software. The broadcast data is organized in tables describing the stream items in hierarchical manner. A description of available services can be obtained in continuous manner particularly from the 'SDT' table, as well as descriptions of broadcasted documents from the 'EIT' table. The hierarchy of the tables together with the identifiers of corresponding packets are described in the DVB document that has just been cited.

Initially, the packets containing the service information are grouped together in order to create a list of programs at the level of the receiver. The user launches his EPG to record an audiovisual document identified by the broadcast service information. The number and/or textual identifier of the current service is displayed in a small window of the screen, independently of the lists displayed. The user selects a document and by pressing a button called "Record", or by clicking a corresponding icon, programs his receiver 1 to record the document.

Figure 2:
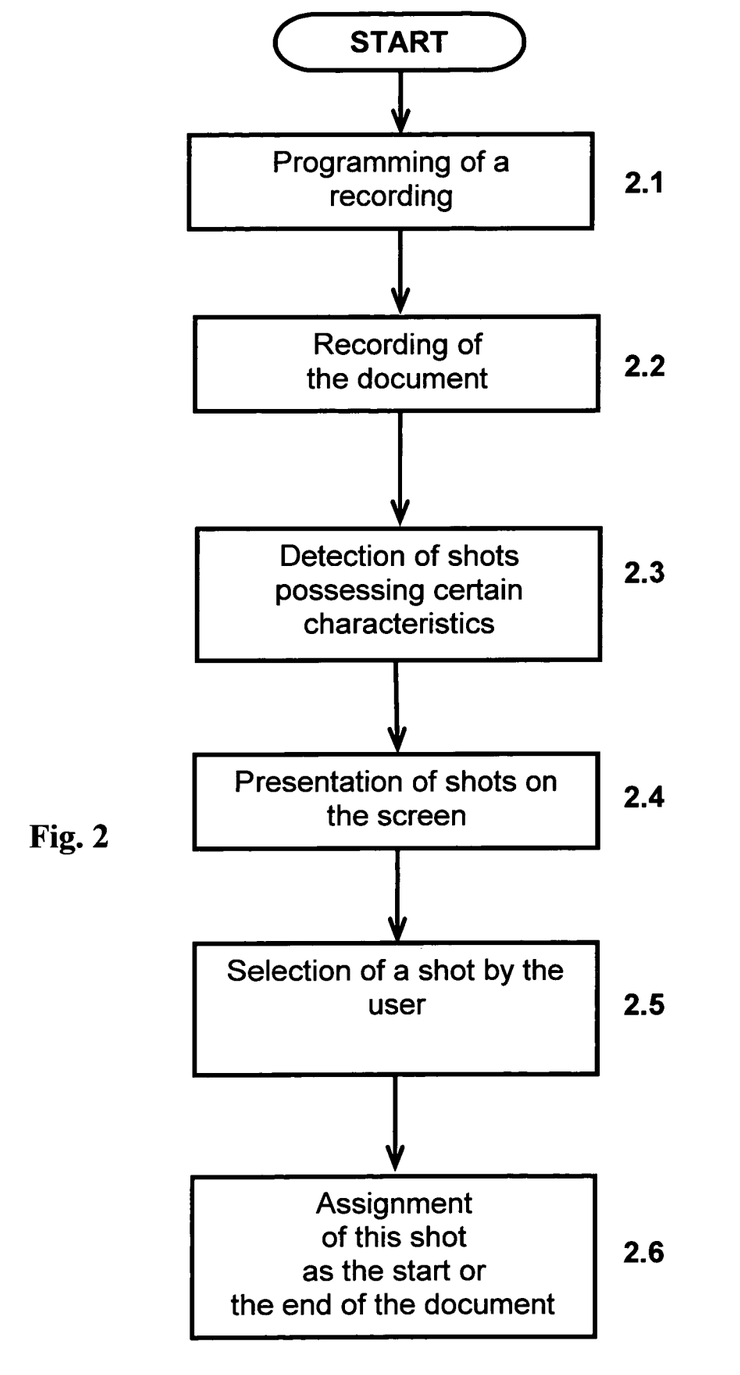
FIG. 2 represents a flow chart showing the sequencing of steps to record a document.

FIG. 2 shows the principle steps of the recording by EPG and the Document Recorder Guide software of an audiovisual document. Initially (step 2.1), the user uses his EPG to select an intended document broadcast on a given service. The service data linked to this document is:
 the time of the start of the document broadcast,
 the duration of the document,
 the broadcast service,
 the title and other characteristics of the document such as:
  the type, the theme, the language, the possible re-broadcasts, etc.

Use validates the record command and the receiver is programmed according to the broadcast time indicated. Advantageously, the receiver has a function to automatically incorporate a temporal margin to trigger the recording five minutes prior to the time intended by the broadcaster and end the recording five minutes after the time intended by the broadcaster. In this way, even if the document is broadcast slightly in advance, the user is sure to record the start and the end.

In step 2.2, the receiver 1 records the audiovisual content of the document desired by the user. The content is recorded in a part 13 of the data memory 9. Recording is carried out even if the user is viewing the document at the same time. If, finally, the user does not want to view this recording, he deletes it from the memory. Otherwise, the present invention enables deletion of the unwanted parts present at the start and end of the recorded content in the memory 9. The user launches the Document Recorder Guide software enabling precise identification of the document within the recorded content. The Document Recorder Guide software first detects the shots having a certain characteristic (step 2.3). A "shot" is an uninterrupted sequence filmed by a camera or camcorder from a single viewpoint. Preferably, these characteristics correspond to the start or end of a determined document, for example:
 the jingle announcing the start or end of an advertising page,
 the music announcing the end of a weather bulletin (the visual content varies, the music stays the same),
 a picture with the text "tonight's film",
 the roaring lion at the beginning of all films by a major film studio,
 a robed woman bearing a torch at the beginning of all films by another major film studio,
 etc.

In step 2.4, the pictures characterizing these various shots are proposed in the menu. Advantageously, the time of broadcast is associated with each picture. The user thus sees a plurality of visual identifiers of shots that were recorded during a predetermined duration at the start of recording, typically fifteen minutes. The user can thus recognize the shot that immediately precedes or starts at the beginning of the document, and the shot that ends or immediately follows the end of the document and select the shots (step 2.5). For example, if the user wants to conserve the document broadcast on a channel the night before, he can see among the displayed identifiers, the classic jingle picture indicating the end of an advertising page. He knows that the pictures after this jingle are the first of the film. So, the user selects this identifier using the direction buttons and in this way, informs the Document Recorder Guide software of the exact start of the document. In this case, the recorded document starts with the shot immediately following the activated shot. If the picture of the robed woman bearing a torch is selected by the user, then the Document Recorder Guide software knows that the recorded document starts with this shot.

In this way, the Document Recorder Guide software takes into account the selection made by the user to identify the exact start of the document as well as the end (step 2.6). Advantageously, once the document has been correctly delimited, the Document Recorder Guide software erases from zone 13 of the memory 9 the audiovisual content parts that are not included in the document.

Figure 3:
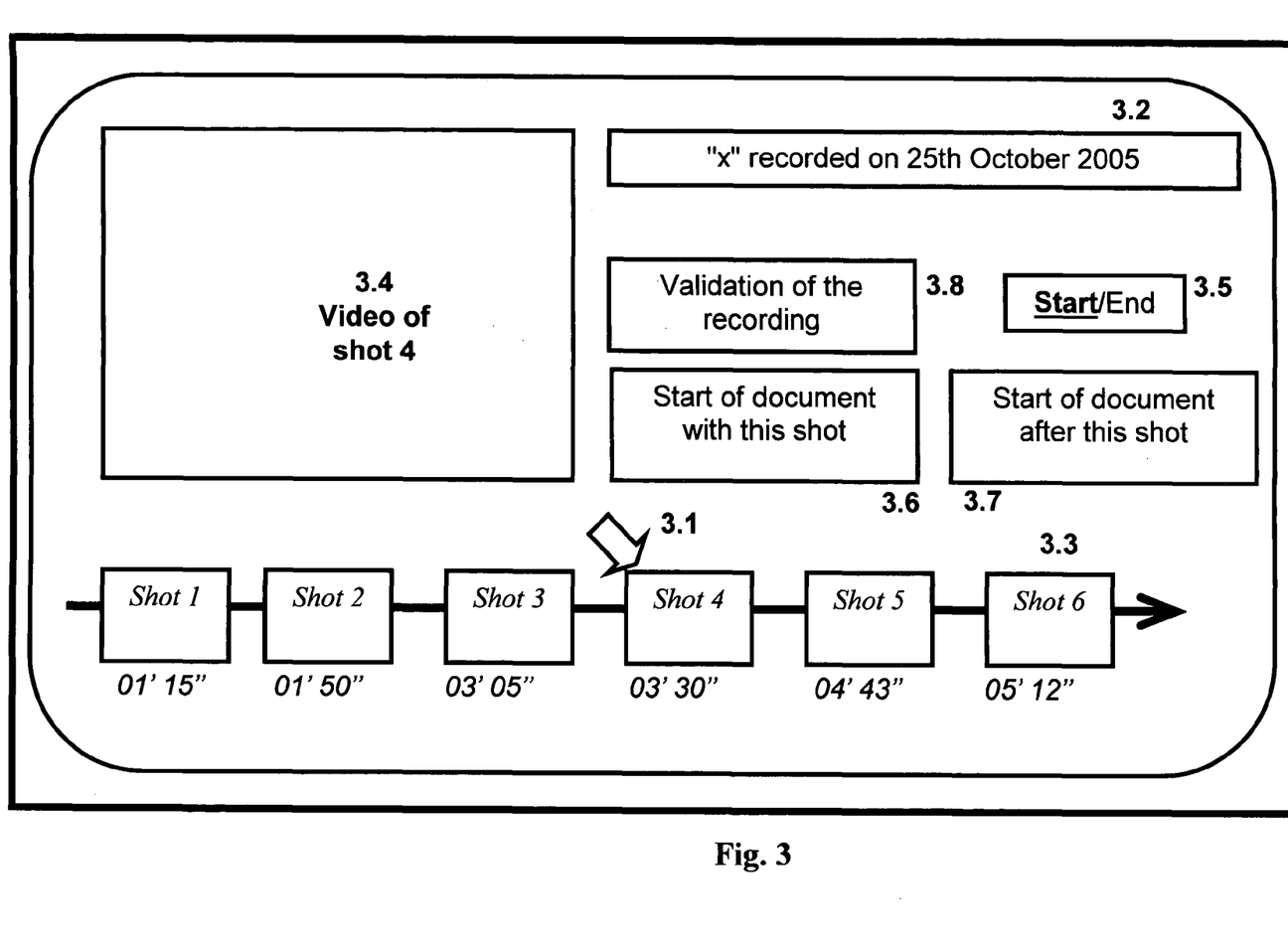
FIG. 3 is an embodiment of a screen appearance showing the display of shots in order to delimit the start of a recorded document.

FIG. 3 shows a screen appearance generated by the Document Recorder Guide software displaying the identifiers for the selection of shots from the start and the end of the document desired by the user. The cursor 3.1 enables selection of different menu elements. The user displaces the curser 3.1 using the direction buttons or a mouse. The menu comprises a header banner 3.2 where the title of the recorded document, as well as the date and the time of the recording are displayed. Shots having a particular characteristic are identified by little pictures 3.3 placed on a line representing the time axis. Advantageously, a temporal indication (in minutes and seconds) is indicated beside each little picture to situate it in time with respect to the start of the recorded content. When the user selects a little picture by positioning the curser over it, the associated video is reproduced in a zone of the screen 3.4. In this way, the user can verify if this shot actually corresponds to the start or end of the recorded document. The user selects the icon entitled "Start/End" to find the shots either at the start or the end of the recorded content.

Figure 4:
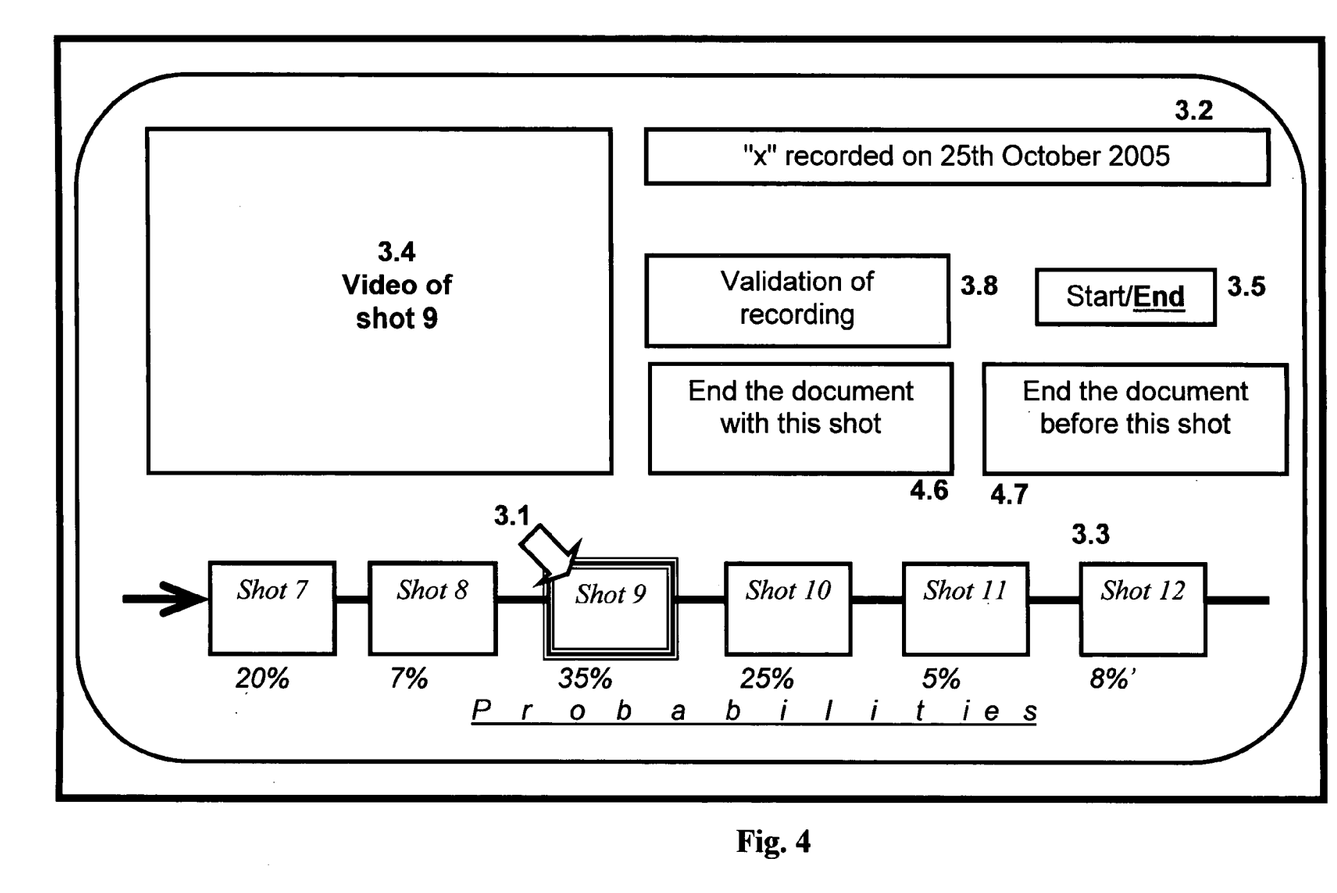
FIG. 4 is another embodiment of a screen appearance showing the display of shots in order to delimit the end of a recorded document according to an improvement of the invention.

When the search concerns the start of the document, the commands to validate the choice are identified by the icons 3.6 "Start of the document with this shot" and 3.7 "Start of the document (immediately) after this shot". When the search concerns the end of the document, the commands to validate the choice are identified by the icons 4.6 "End of document with this shot" and 4.7 "End of document (immediately) before this shot". Let us assume that the picture of the jingle at the beginning of an advertisement page is among the identifiers. The user selects this identifier that is then highlighted and activates the icon "Start of document after this shot". In the same way, if he sees an identifier showing a picture with "The End" then he selects this identifier and activates the icon "End the document with this shot". In this case, the last recorded document shot is that of the selected shot. Successive selections of the icon "Start/End" will cause the appearance of:

either the icons: "Start of document after this shot", 3.6

"Start of document with this shot", 3.7 or the icons: "End of document before this shot", 4.6

"End of document with this shot". 4.7

When the user has selected and validated the shots marking the start and end of the recorded document, he activates the icon 3.8 called "Validate the recording". The Document Recorder Guide software then modifies the pointers in the memory to perfectly delimit the document and hence when the user requests a reproduction, the document starts and ends with the correct shots. Advantageously, the Document Recorder Guide software deletes the recorded content situated before the start of the document and after the end of the document.

It has previously been stated that the detection of characteristic shots can be carried out in several ways, and notably by the detection of a pattern of at least a picture or a pattern of an audio sequence. These patterns are placed in a table and used as entry data by a pattern recognition routine. According to an improvement of the present invention, the Document Recorder Guide software presents the user with detected shots while displaying a probability value. This probability value can be determined directly by the detection means, hence the picture of the robed woman bearing a torch or of the roaring lion have a higher probability of starting a film than a shot following a jingle from an advertising page. Certain patterns are more characteristic than others to be identified as the start or end of a document. Each pattern received by the receiver 1 is associated with an absolute probability value within a pattern table. Following document analysis the absolute probability values of all the shots are added and adjusted to a relative value for the document so that the sum of the probabilities is equal to 100%. The relative values are then displayed for example under the identifiers. According to a variant, the shot identifiers are presented on the screen in order according to their respective probability values. For example, the identifier on the left of the screen corresponds to the shot that has the highest probability of being the shot that starts the document (or ends it).

An example of the structure of a pattern table is shown:

| Pattern name | Pattern data address | Probability value |
|---|---|---|
| Weather bulletin music | PT1 | 20% |
| Roaring lion | PT2 | 90% |
| Robed woman bearing a torch | PT3 | 90% |
| Jingle ending an advertising page | PT4 | 40% |
| Space 1999 music | PT5 | 70% |
| ... | ... | ... |

Another way to determine the probabilities involves using the number of selections performed by the user. For that, each pattern in the table is associated with a counter that is incremented each time that the user selects a picture corresponding to the pattern. When a new content is selected by the user to define the start and end shots, the Document Recorder Guide software detects the characteristic shots with patterns in the memory and displays the counter values in the form of a percentage.

An example of the table structure to implement the improvement is shown hereafter:

| Pattern name | Pattern data address | Selections counter |
|---|---|---|
| Weather bulletin music | PT1 | 8 |
| Roaring lion | PT2 | 2 |
| Robed woman bearing a torch | PT3 | 3 |
| Jingle ending an advertising page | PT4 | 6 |
| Space 1999 music | PT5 | 0 |
| ... | ... | ... |

Another way to determine the probability associated with a shot involves exploiting the fact that the duration of the document is known. This duration is usually transmitted with the service information linked with broadcast programs. When the user selects the identifier corresponding to shot at the start of the document, the Document Recorder Guide software will search for the shot at the end of the duration and attribute to this shot a maximum probability, 50% for example. This way of determining probabilities can be combined perfectly with the two previous methods.

FIG. 4 illustrates the improvement consisting in attributing probabilities to each determined shot and in displaying them on the screen. This displayed menu enables the search for shots that allow identification of the end of the document. The visual identifiers of the shots that were recorded during a predetermined period at the end of the recording, typically over the final fifteen-minute period, are displayed. In the example illustrated, the picture associated with shot number 9 is graphically highlighted and the video of this shot appears in the zone 3.4 on the upper left. The probability levels appear below each picture, thus giving the user an indication of the preferable choice of shot to start or end the document. The probability level is calculated from the counter values of selections recorded in the table above. Initially, the Document Recorder Guide software correlates the shots detected in step 2.3 with the shots referenced by the table. Several methods enabling correlation of two shots can be used here. We can cite for example the method initially consisting in extracting from each picture of a compact signature characterizing the colour and texture of the picture (for example colour and gradient histograms). A calculation of distance between two histograms enables information on the resemblance of the two pictures to be obtained. The distance between the two shots results in matching the pictures of the two shots in pairs (if a picture n of a first shot corresponds to a picture m of a second shot then the picture n+1 corresponds to the picture m+1). Two shots will be correlated if the average distance between pictures is less than a threshold. If no detected shot corresponds to a referenced pattern, then each detected shot has the same probability of being selected. Otherwise, the Document Recorder Guide software assigns, to non-referenced shots, the minimum probability, normally 5%, the probabilities of other shots are determined proportionally to the counter value. For example, the Document Recorder Guide software has detected at the start of the recording five shots characteristic of the jingle at the end of an advertising page (counter value: 6) and of the roaring lion (counter value: 1). The Document Recorder Guide software assigns 5% for the three non-referenced shots, 60% for the jingle at the end of an advertising page and 20% for the roaring lion.

When the selection menu in FIG. 4 appears, the focus and the curser 3.1 are placed by the Document Recorder Guide software on the little picture having the highest probability. In the previous example, the Document Recorder Guide software focuses on the picture identifying the jingle at the end of an advertising page. In this way, the Document Recorder Guide software aids the user in the choice to be made.

Each time the user selects a shot referenced in the table, its counter is incremented.

The invention claimed is:

1. Method for identifying an audiovisual document within a reproduction device, said document being part of a recorded content also containing a part that does not belong with said document, wherein it comprises the steps of:
 a displaying of identifiers associated with shots having determined characteristics and a display with an indication of the probability associated with each shot that this shot is indeed the identifier of the start or the end of said document,
 an identification of the start or the end of said document by the introduction of a displayed identifier selection command into the reproduction device, the start or the end of said document having been identified by the shot associated with the selected identifier.

2. Method for identifying an audiovisual document according to claim 1, wherein the probability value of a given shot is a function of the number of preceding shot selections having the same determined characteristic as the given shot.

3. Method for identifying an audiovisual document according to claim 1, wherein the probability value of a shot depends on the detection method based on the determined characteristic that enabled its detection and the display of its identifier.

4. Method for identifying an audiovisual document according to claim 1, wherein, following the identification of the start or the end of said document by the introduction of a selection command, the probability value of a given shot is increased if the duration between this given shot and the shot selected by the command correspond to the duration of the document.

5. Method for identifying an audiovisual document according to claim 1, wherein the displaying presents shot identifiers according to an order depending on their respective probability values.

6. Method for identifying an audiovisual document according to claim 1, wherein the shot identifier having the highest probability is graphically highlighted.

7. Method for identifying an audiovisual document according to claim 1, wherein the detection only detects shots over a determined period from the start of the recorded content and/or from the end of the recorded content.

8. Method for identifying an audiovisual document according to claim 1, wherein the selection is carried out on the shot immediately preceding the shot that is identified as being the start of the document, or on the shot immediately after the shot that is identified as being the end of the document.

9. Display device comprising a means to command the recording of a document and a means to record an audiovisual content comprising said document and at least one part not belonging to said document,
 wherein it comprises a means to display the identifiers associated with the shots from recorded content and an indication of the probability associated with each shot so that said shot is indeed the shot identifying the start or end of said document, said associated shots having a determined characteristic and,
 a means of introducing a selection command for one of the displayed identifiers, the start or end of said document being identified by the shot associated with the selected identifier.

10. Display device according to claim 9, wherein it comprises a means to calculate the probability value of a given shot taking into account the number of preceding shot selections having the same determined characteristic as the given shot.

11. Display device according to claim 9, wherein it comprises a means to calculate the probability value of a given shot taking into account the detection method based on the determined characteristic that enabled its detection and the display of its identifier.

12. Display device according to claim 9, wherein it comprises a means to calculate the probability value of a given shot taking into account the duration of the document and the shot selection as the start or end of the document, if the period between the given shot and the selected shot is equal to the duration of the document, the probability of the given shot is increased.

13. Display device according to claim 9, wherein the display means presents the shot identifiers according to an order depending on their respective probability values.

14. Display device according to claim 9, wherein the display means presents the shot identifier having the highest probability value with a graphical distinction.

* * * * *